(12) United States Patent
Wang et al.

(10) Patent No.: US 8,665,856 B2
(45) Date of Patent: Mar. 4, 2014

(54) DATA PROCESSING APPARATUS, COMMUNICATION DEVICE, AND DATA PROCESSING METHOD

(75) Inventors: Daowei Wang, Shenzhen (CN); Chunxing Huang, Shenzhen (CN); Daochun Mo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 414 days.

(21) Appl. No.: 12/959,193

(22) Filed: Dec. 2, 2010

(65) Prior Publication Data

US 2011/0134905 A1    Jun. 9, 2011

Related U.S. Application Data

(63) Continuation of application No. PCT/CN2009/070630, filed on Mar. 4, 2009.

(30) Foreign Application Priority Data

Jun. 2, 2008   (CN) .......................... 2008 1 0067616

(51) Int. Cl.
*H04J 3/00* (2006.01)
(52) U.S. Cl.
USPC ........... 370/345; 375/267; 375/295; 375/224; 375/340; 375/141; 455/556.1; 455/425
(58) Field of Classification Search
USPC .......... 370/345; 375/267, 295, 224, 340, 141; 455/556.1, 425
See application file for complete search history.

(56) References Cited

U.S. PATENT DOCUMENTS

| 5,237,593 A | 8/1993 | Fisher et al. |
| 5,703,882 A | 12/1997 | Jung et al. |
| 6,327,262 B1 * | 12/2001 | Jeong .......................... 370/395.1 |
| 2004/0151109 A1 | 8/2004 | Batra et al. |

(Continued)

FOREIGN PATENT DOCUMENTS

| CN | 1964478 A | 5/2007 |
| CN | 1972261 A | 5/2007 |

(Continued)

OTHER PUBLICATIONS

Written Opinion of the International Searching Authority dated Jun. 4, 2009 in connection with International Patent Application No. PCT/CN2009/070630.

(Continued)

*Primary Examiner* — Faruk Hamza
*Assistant Examiner* — Shah R Zaman

(57) ABSTRACT

A data processing apparatus includes a scrambling processing unit and a sending unit. The scrambling processing unit is configured to generate a Pseudo-Random Binary Sequence (PRBS), perform a modulo-2 addition on the pseudo-random sequence and data frame data to scramble the data frame data including first load data, use one section of a part of the pseudo-random sequence on which the modulo-2 addition is performed with the data frame data as an identification sequence, and carry status information corresponding to the identification sequence in frame header information. The sending unit is configured to send the frame header information carrying the status information and the scrambled first load data. Through the scrambling process, continuous run-lengths of "1" and "0" in the data frame data are quite short, while basically the same probability of occurrence is maintained, which is favorable to transmission of the data frame data, thereby alleviating error code problems.

6 Claims, 11 Drawing Sheets

(56) References Cited

U.S. PATENT DOCUMENTS

| | | | |
|---|---|---|---|
| 2005/0229230 A1* | 10/2005 | Santoru et al. | 725/126 |
| 2006/0159263 A1* | 7/2006 | Cha et al. | 380/210 |
| 2007/0133703 A1 | 6/2007 | Kim et al. | |
| 2008/0219220 A1* | 9/2008 | Gerakoulis | 370/335 |
| 2009/0063936 A1 | 3/2009 | Kanda et al. | |
| 2012/0257697 A1* | 10/2012 | Zhou et al. | 375/346 |

FOREIGN PATENT DOCUMENTS

| | | |
|---|---|---|
| CN | 1972268 A | 5/2007 |
| CN | 101047474 A | 10/2007 |
| CN | 101176288 A | 5/2008 |
| WO | WO 2006/123542 A1 | 11/2006 |

OTHER PUBLICATIONS

Office Action dated May 21, 2010 in connection with Chinese Patent Application No. 200810067616.5.

International Search Report dated Jun. 4, 2009 in connection with International Patent Application No. PCT/CN2009/070630.

* cited by examiner

201

Retrieve first status information from frame header information of a first data frame, acquire a first identification sequence corresponding to the first status information according to the first status information, adjust a procedure of generating a pseudo-random sequence according to the first identification sequence, so as to generate a PRBS corresponding to data frame data to be descrambled, retrieve M (M is an integer greater than or equal to 1) pieces of second status information from frame header information of M data frames subsequent to the first data frame, acquire M second identification sequences corresponding to the M pieces of second status information according to the M pieces of second status information, use data frame data corresponding to the M second identification sequences as reference data, retrieve M sections of sample pseudo-random sequences corresponding to the reference data from the generated pseudo-random sequence, and compare the M second identification sequences with the M sections of sample pseudo-random sequences, in which if L (L is an integer, and 0L<M) second identification sequences in the M second identification sequences are consistent with the corresponding sample pseudo-random sequences, Step 201 is performed, and if the M second identification sequences are consistent with the corresponding sample pseudo-random sequences, Step 202 is performed

202

Retrieve N (N is an integer greater than or equal to 1) pieces of third status information from frame header information of N data frames, acquire N third identification sequences corresponding to the N pieces of third status information according to the N pieces of third status information, use data frame data corresponding to the N third identification sequences as reference data, retrieve N sections of sample pseudo-random sequences corresponding to the reference data from the generated pseudo-random sequence, and compare the N third identification sequences with the N sections of sample pseudo-random sequences, in which if K (K is an integer, and 0K<N) third identification sequences in the N third identification sequences are inconsistent with the corresponding sample pseudo-random sequences, Step 202 is performed, and if the N third identification sequences are inconsistent with the corresponding sample pseudo-random sequence, Step 201 is performed

FIG. 14

DATA PROCESSING APPARATUS, COMMUNICATION DEVICE, AND DATA PROCESSING METHOD

CROSS-REFERENCE TO RELATED APPLICATIONS

This application is a continuation of International Application No. PCT/CN2009/070630, filed on Mar. 4, 2009, which claims priority to Chinese Patent Application No. 200810067616.5, filed on Jun. 2, 2008, both of which are hereby incorporated by reference in their entireties.

TECHNICAL FIELD

The present invention relates to the field of electronic communications technologies, and in particular, to a data processing apparatus, a communications device, and a data processing method.

BACKGROUND

In a Time Division Multiplexing (TDM) technology, the time provided to an entire channel for transmitting information is divided into several time slices (referred to as time slots for short), and the time slots are assigned to multiple paths of signals, each path of signal is used for conducting data transmission by exclusively occupying the channel in its own time slot, and a plurality of data streams with low rates is combined as a single data stream with a high rate.

A feature of the TDM technology is that the time slots are planned and assigned in advance and remain unchanged, so that the TDM is sometimes called Synchronization Time Division Multiplexing (STDM). Being a device for implementing the TDM technology, a time division multiplexer is mainly configured to split multiple channels of data from a plurality of source ends into a plurality of data segments (bits or bytes), where the data segments are transmitted in a specified order, so that the plurality of data streams input to the time division multiplexer is converted to one data stream including all the data segments of the input data streams, and each data segment occupies one time slice or time slot.

In a physical channel, for a transmitted code stream signal, usually since "0" or "1" occurs continuously in the data, when the code type is transmitted in a high rate channel, distortion of the code type easily occurs, and relatively serious Inter-symbol Interference (ISI) influences are generated.

Recently, the problem is solved by using an encoding mode, for example, a common 8B/10B encoding process; however, after the encoding, a malicious code type where a code type with a low switch density and a code type with a high switch density alternately exist may occur, and a time length between the code type with a low switch density and the code type with a high switch density being neighboring on each other is equivalent to or longer than a time constant of receiving a Clock Data Recovery (CDR) circuit. The malicious code type may generate phase transitions. As a result, huge offset may occur to CDR receiving, which may results in serious bit errors.

SUMMARY

The embodiment of present invention is directed to a data processing method, a data processing apparatus, and a communications device, capable of effectively alleviating bit error problems when a signal is transmitted by adopting a TDM technology.

In order to achieve the objectives, an embodiment of the present invention provides a data processing apparatus, where the apparatus includes:

a scrambling processing unit, configured to generate a Pseudo-Random Binary Sequence (PRBS), perform a modulo-2 addition on the pseudo-random sequence and data frame data so as to scramble the data frame data including first load data, use one section of a part of the pseudo-random sequence on which the modulo-2 addition is performed with the data frame data as an identification sequence, and carry status information corresponding to the identification sequence in frame header information; and a sending unit, configured to send the frame header information carrying the status information and the scrambled first load data.

In order to achieve the objectives, an embodiment of the present invention provides a communications device, where the communications device includes:

a scrambling processing unit, configured to generate a PRBS, perform a modulo-2 addition on the pseudo-random sequence and data frame data so as to scramble the data frame data including first load data, use one section of a part of the pseudo-random sequence on which the modulo-2 addition is performed with the data frame data as an identification sequence, and carry status information corresponding to the identification sequence in frame header information; and a sending unit, configured to send the frame header information carrying the status information and the scrambled first load data.

In order to achieve the objectives, an embodiment of the present invention provides a communications device, where the device includes:

a scrambling processing unit, configured to generate a PRBS, perform a modulo-2 addition on the pseudo-random sequence and data frame data so as to scramble the data frame data including first load data, use one section of apart of the pseudo-random sequence on which the modulo-2 addition is performed with the data frame data as an identification sequence, and carry status information corresponding to the identification sequence in frame header information;

an encoding unit, configured to encode the frame header information carrying the status information and the scrambled first load data;

a serial-to-parallel conversion unit, configured to perform a serial-to-parallel conversion process on the frame header information and the first load data after being encoded; and a delivery unit, configured to send the frame header information and the first load data after the serial-to-parallel conversion process.

In order to achieve the objectives, an embodiment of the present invention provides a data processing apparatus, where the apparatus includes:

a receiving unit, configured to receive a scrambled data frame, where frame header information of the data frame carries status information;

a retrieving unit, configured to retrieve the status information from the frame header information; and a descrambling unit, configured to generate a PRBS, where the descrambling unit adjusts, according to the status information, a procedure of generating the PRBS, so as to generate the PRBS corresponding to data frame data to be descrambled; and further configured to perform a modulo-2 addition on the pseudo-random sequence and first load data, and descramble the first load data.

In order to achieve the objectives, an embodiment of the present invention provides a communications device, where the device includes:

a receiving unit, configured to receive a scrambled data frame, where frame header information of the data frame carries status information;

a retrieving unit, configured to retrieve the status information from the frame header information; and a descrambling unit, configured to generate a PRBS, where the descrambling unit adjusts, according to the status information, a procedure of generating the PRBS, so as to generate the PRBS corresponding to data frame data to be descrambled; and further configured to perform a modulo-2 addition on the pseudo-random sequence and first load data, and descramble the first load data.

In order to achieve the objectives, an embodiment of the present invention provides a communications device, where the device includes:

a receiving unit, configured to receive a scrambled data frame, where frame header information of the data frame carries status information;

a serial-to-parallel conversion unit, configured to perform a serial-to-parallel conversion process on the scrambled data frame;

a decoding unit, configured to decode the data frame after the serial-to-parallel conversion process; and further configured to generate a frame indication signal when identifying a fixed starting byte of the frame header information from the data frame after the serial-to-parallel conversion process, where the frame indication signal is configured to prompt that the frame header information of the data frame arrives;

a retrieving execution unit, configured to retrieve, according to the frame indication signal, the status information from the frame header information, when knowing that the frame header information arrives; and a descrambling unit, configured to generate a PRBS, where the descrambling unit adjusts, according to the status information, a procedure of generating the PRBS, so as to generate the PRBS corresponding to data frame data to be descrambled; and further configured to perform a modulo-2 addition on the pseudo-random sequence and first load data, and descramble the first load data.

In order to achieve the objectives, an embodiment of the present invention provides a scrambling synchronization detection method, where the method includes:

step 201: retrieving first status information from frame header information of a first data frame, acquiring, according to the first status information, a first identification sequence corresponding to the first status information, adjusting a procedure of generating, according to the first identification sequence, a pseudo-random sequence, so as to generate a PRBS corresponding to data frame data to be descrambled, retrieving M pieces of second status information from frame header information of M data frames subsequent to the first data frame, acquiring, according to the M pieces of second status information, M second identification sequences corresponding to the M pieces of second status information, using data frame data corresponding to the M second identification sequences as reference data, retrieving M sections of sample pseudo-random sequences corresponding to the reference data from the generated pseudo-random sequence, and comparing the M second identification sequences with the M sections of sample pseudo-random sequences, where if L second identification sequences in the M second identification sequences are consistent with the corresponding sample pseudo-random sequences, step 201 is performed, and if the M second identification sequences are inconsistent with the corresponding sample pseudo-random sequences, step 202 is performed, where M is an integer greater than or equal to 1, L is an integer, and $0 \leq L < M$; and step 202: retrieving N pieces of third status information from frame header information of N data frames, acquiring, according to the N pieces of third status information, N third identification sequences corresponding to the N pieces of third status information, using data frame data corresponding to the N third identification sequences as reference data, retrieving N sections of sample pseudo-random sequences corresponding to the reference data from the generated pseudo-random sequence, and comparing the N third identification sequences with the N sections of sample pseudo-random sequences, where if K third identification sequences in the N third identification sequences are inconsistent with the corresponding sample pseudo-random sequences, step 202 is performed, and if the N third identification sequences are inconsistent with the corresponding sample pseudo-random sequences, step 201 is performed, where N is an integer greater than or equal to 1, K is an integer, and $0 \leq K < N$.

In order to achieve the objectives, an embodiment of the present invention provides a scrambling synchronization detection apparatus, where the apparatus includes:

a scrambling synchronization unit, configured to retrieve first status information from frame header information of a first data frame, acquire, according to the first status information, a first identification sequence corresponding to the first status information, adjust, according to the first identification sequence, a procedure of generating a pseudo-random sequence, so as to generate a PRBS corresponding to data frame data to be descrambled, retrieve M pieces of second status information from frame header information of M data frames subsequent to the first data frame, acquire, according to the M pieces of second status information, M second identification sequences corresponding to the M pieces of second status information, use data frame data corresponding to the M second identification sequences as reference data, retrieve M sections of sample pseudo-random sequences corresponding to the reference data from the generated pseudo-random sequence, and compare the M second identification sequences with the M sections of sample pseudo-random sequences, where if L second identification sequences in the M second identification sequences are consistent with the corresponding sample pseudo-random sequences, the scrambling synchronization unit continues execution, and if the M second identification sequences are consistent with the corresponding sample pseudo-random sequences, a synchronization detection unit starts execution, where M is an integer greater than or equal to 1, L is an integer, and $0 \leq L < M$; and the synchronization detection unit, configured to retrieve N pieces of third status information from frame header information of N data frames, acquire, according to the N pieces of third status information, N third identification sequences corresponding to the N pieces of third status information, use data frame data corresponding to the N third identification sequences as reference data, retrieve N sections of sample pseudo-random sequences corresponding to the reference data from the generated pseudo-random sequence, and compare the N third identification sequences with the N sections of sample pseudo-random sequences, where if K third identification sequences in the N third identification sequences are inconsistent with the corresponding sample pseudo-random sequences, the synchronization detection unit continues execution, and if the N third identification sequences are inconsistent with the corresponding sample pseudo-random sequences, the scrambling synchronization unit starts execution, where N is an integer greater than or equal to 1, K is an integer, and $0 \leq K < N$.

In order to achieve the objectives, an embodiment of the present invention provides a communications device, where the device includes:

a descrambling execution unit, configured to generate a PRBS, perform a modulo-2 addition on the pseudo-random sequence and data frame data, so as to descramble the data frame data;

a scrambling synchronization unit, configured to retrieve first status information from frame header information of a first data frame, acquire, according to the first status information, a first identification sequence corresponding to the first status information, adjust, according to the first identification sequence, a procedure of generating a pseudo-random sequence, so as to generate the PRBS corresponding to the data frame data to be descrambled, retrieve M pieces of second status information from frame header information of M data frames subsequent to the first data frame, acquire, according to the M pieces of second status information, M second identification sequences corresponding to the M pieces of second status information, use the data frame data corresponding to the M second identification sequences as reference data, retrieve M sections of sample pseudo-random sequences corresponding to the reference data from the generated pseudo-random sequence, and compare the M second identification sequences with the M sections of sample pseudo-random sequences, where if L second identification sequences in the M second identification sequences are consistent with the corresponding sample pseudo-random sequences, the scrambling synchronization unit continues execution, and if the M second identification sequences are consistent with the corresponding sample pseudo-random sequences, a synchronization detection unit starts execution, where M is an integer greater than or equal to 1, L is an integer, and 0≤L<M; and the synchronization detection unit, configured to retrieve N pieces of third status information from frame header information of N data frames, acquire, according to the N pieces of third status information, N third identification sequences corresponding to the N pieces of third status information, use data frame data corresponding to the N third identification sequences as reference data, retrieve N sections of sample pseudo-random sequences corresponding to the reference data from the generated pseudo-random sequence, and compare the N third identification sequences with the N sections of sample pseudo-random sequences, where if K third identification sequences in the N third identification sequences are inconsistent with the corresponding sample pseudo-random sequences, the synchronization detection unit continues execution, and if the N third identification sequences are inconsistent with the corresponding sample pseudo-random sequences, the scrambling synchronization unit starts execution, where N is an integer greater than or equal to 1, K is an integer, and 0≤K<N.

In order to achieve the objectives, an embodiment of the present invention provides a data processing method, where the method includes:

step 301: generating a PRBS, performing a modulo-2 addition on the pseudo-random sequence and data frame data so as to scramble the data frame data including first load data, using one section of a part of the pseudo-random sequence on which the modulo-2 addition is performed with the data frame data as an identification sequence, and carrying status information corresponding to the identification sequence in frame header information; and step 302: sending the frame header information carrying the status information and the scrambled first load data.

In order to achieve the objectives, an embodiment of the present invention provides a data processing method, where the method includes:

step 401: generating a PRBS, performing a modulo-2 addition on the pseudo-random sequence and data frame data so as to scramble the data frame data including first load data, using one section of a part of the pseudo-random sequence on which the modulo-2 addition is performed with the data frame data as an identification sequence, and carrying status information corresponding to the identification sequence in frame header information;

step 402: encoding the frame header information carrying the status information and the scrambled first load data;

step 403: performing a serial-to-parallel conversion process on the frame header information and the first load data after being encoded; and step 404: sending the frame header information and the first load data after the serial-to-parallel conversion process.

In order to achieve the objectives, an embodiment of the present invention provides a data processing method, where the method includes:

step 501: receiving a scrambled data frame, where frame header information of the data frame carries status information, retrieving the status information from the frame header information, and adjusting, according to the status information, a procedure of generating a PRBS, so as to generate the PRBS corresponding to data frame data to be descrambled; and step 502: performing a modulo-2 addition on the pseudo-random sequence and first load data, and descrambling the first load data.

In order to achieve the objectives, an embodiment of the present invention provides a data processing method, where the method includes:

step 601: receiving a scrambled data frame, where frame header information of the data frame carries status information;

step 602: performing a serial-to-parallel conversion process on the scrambled data frame;

step 603: decoding the data frame after the serial-to-parallel conversion process; and generating a frame indication signal, when identifying a fixed starting byte of the frame header information from the data frame after the serial-to-parallel conversion process, where the frame indication signal is configured to prompt that the frame header information of the data frame arrives;

step 604: retrieving, according to the frame indication signal, the status information from the frame header information, when knowing that the frame header information arrives; and step 605: adjusting, according to the status information, a procedure of generating a PRBS, so as to generate the PRBS corresponding to data frame data to be descrambled; and performing a modulo-2 addition on the pseudo-random sequence and first load data so as to descramble the first load data.

In order to achieve the objectives, an embodiment of the present invention provides a network system, where the system includes a first communications device or a second communications device, and a third communications device or a fourth communications device or a fifth communications device.

The first communications device includes:

a scrambling processing unit, configured to generate a PRBS, perform a modulo-2 addition on the pseudo-random sequence and data frame data so as to scramble the data frame data including first load data, use one section of a part of the pseudo-random sequence on which the modulo-2 addition is performed with the data frame data as an identification sequence, and carry status information corresponding to the identification sequence in frame header information; and a sending unit, configured to send the frame header information carrying the status information and the scrambled first load data.

The second communications device includes:

a scrambling processing unit, configured to generate a PRBS, perform a modulo-2 addition on the pseudo-random sequence and data frame data so as to scramble the data frame data including first load data, use one section of apart of the pseudo-random sequence on which the modulo-2 addition is performed with the data frame data as an identification sequence, and carry status information corresponding to the identification sequence in frame header information;

an encoding unit, configured to encode the frame header information carrying the status information and the scrambled first load data;

a serial-to-parallel conversion unit, configured to perform a serial-to-parallel conversion process on the frame header information and the first load data after being encoded; and a delivery unit, configured to send the frame header information and the first load data after the serial-to-parallel conversion process.

The third communications device includes:

a receiving unit, configured to receive a scrambled data frame, where frame header information of the data frame carries status information;

a retrieving unit, configured to retrieve the status information from the frame header information; and a descrambling unit, configured to generate a PRBS, where the descrambling unit adjusts, according to the status information, a procedure of generating the PRBS, so as to generate the PRBS corresponding to data frame data to be descrambled; and further configured to perform a modulo-2 addition on the pseudo-random sequence and first load data so as to descramble the first load data.

The fourth communications device includes:

a receiving unit, configured to receive a scrambled data frame, where frame header information of the data frame carries status information;

a serial-to-parallel conversion unit, configured to perform a serial-to-parallel conversion process on the scrambled data frame;

a decoding unit, configured to decode the data frame after the serial-to-parallel conversion process; and further configured to generate a frame indication signal when identifying a fixed starting byte of the frame header information from the data frame after the serial-to-parallel conversion process, where the frame indication signal is configured to prompt that the frame header information of the data frame arrives;

a retrieving execution unit, configured to retrieve, according to the frame indication signal, the status information from the frame header information, when knowing that the frame header information arrives; and a descrambling unit, configured to generate a PRBS, where the descrambling unit adjusts, according to the status information, a procedure of generating the PRBS, so as to generate the PRBS corresponding to data frame data to be descrambled; and further configured to perform a modulo-2 addition on the pseudo-random sequence and first load data so as to descramble the first load data.

The fifth communications device includes:

a descrambling execution unit, configured to generate a PRBS, perform a modulo-2 addition on the pseudo-random sequence and data frame data, and descramble the data frame data;

a scrambling synchronization unit, configured to retrieve first status information from frame header information of a first data frame, acquire, according to the first status information, a first identification sequence corresponding to the first status information, adjust, according to the first identification sequence, a procedure of generating a pseudo-random sequence, so as to generate the PRBS corresponding to the data frame data to be descrambled, retrieve M pieces of second status information from frame header information of M data frames subsequent to the first data frame, acquire, according to the M pieces of second status information, M second identification sequences corresponding to the M pieces of second status information, use the data frame data corresponding to the M second identification sequences as reference data, retrieve M sections of sample pseudo-random sequences corresponding to the reference data from the generated pseudo-random sequence, and compare the M second identification sequences with the M sections of sample pseudo-random sequences, where if L second identification sequences in the M second identification sequences are consistent with the corresponding sample pseudo-random sequences, the scrambling synchronization unit continues execution, and if the M second identification sequences are consistent with the corresponding sample pseudo-random sequences, a synchronization detection unit starts execution, where M is an integer greater than or equal to 1, L is an integer, and $0 \leq L < M$; and the synchronization detection unit, configured to retrieve N pieces of third status information from frame header information of N data frames, acquire, according to the N pieces of third status information, N third identification sequences corresponding to the N pieces of third status information, use data frame data corresponding to the N third identification sequences as reference data, retrieve N sections of sample pseudo-random sequences corresponding to the reference data from the generated pseudo-random sequence, and compare the N third identification sequences with the N sections of sample pseudo-random sequences, where if K third identification sequences in the N third identification sequences are inconsistent with the corresponding sample pseudo-random sequences, the synchronization detection unit continues execution, and if the N third identification sequences are inconsistent with the corresponding sample pseudo-random sequences, the scrambling synchronization unit starts execution, where N is an integer greater than or equal to 1, K is an integer, and $0 \leq K < N$.

In the present invention, through the scrambling process, continuous run-lengths of "1" and "0" in the data frame data are quite short, while basically the same probability of occurrence is maintained, which is favorable to transmission of the data frame data, thereby alleviating error code problems.

BRIEF DESCRIPTION OF THE DRAWINGS

To illustrate the technical solutions according to the embodiments of the present invention or in the prior art more clearly, the accompanying figures for describing the embodiments or the prior art are introduced briefly in the following. Apparently, the accompanying drawings in the following description are only some embodiments of the present invention; persons of ordinary skill in the art can obtain other drawings according to the accompanying drawings without creative efforts.

FIG. 14 is a schematic view of an embodiment of a scrambling synchronization detection method according to the present invention;

DETAILED DESCRIPTION

The technical solutions of the present invention will be clearly and fully described below with reference to the accompanying drawings. It is obvious that the embodiments to be described are only a part rather than all of the embodiments of the present invention. All other embodiments derived by persons of ordinary skill in the art based on the embodiments of the present invention without creative efforts shall fall within the scope of the present invention.

Figure 1:
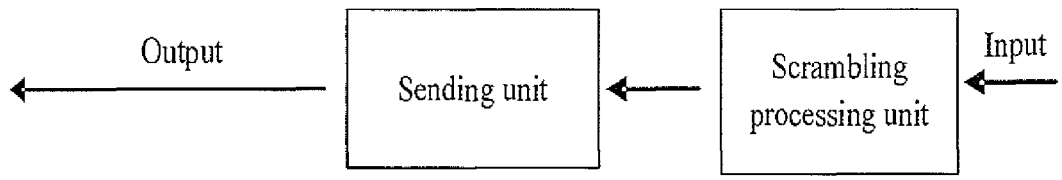
FIG. 1 is a schematic view of a data processing apparatus according to a first embodiment of the present invention.

As shown in FIG. 1, the present invention provides a first embodiment of a data processing apparatus, which includes a scrambling processing unit and a sending unit.

The scrambling processing unit is configured to generate a PRBS, perform a modulo-2 addition on the pseudo-random sequence and data frame data, scramble the data frame data including first load data, use one section of a part of the pseudo-random sequence on which the modulo-2 addition is performed with the data frame data as an identification sequence, and carry status information corresponding to the identification sequence in frame header information.

The sending unit is configured to send the frame header information carrying the status information and the scrambled first load data.

The first embodiment of the data processing apparatus may be disposed on a sending end of a data frame.

Continuous run-lengths of "1" and "0" in the data frame (in the embodiment of the present invention, the data frame may be a TDM data frame) data acquired after being scrambled are quite short, while basically the same probability of occurrence is maintained, thereby alleviating bit error problems. Further, when a receiving end receives a code stream of the data frame data, the code stream of the data frame data is scrambled, so a malicious code type is avoided, thereby improving the recovery quality of a timing clock, and smoothing the signal spectrum, which is favorable to channel transmission.

The pseudo-random sequence is corresponding to the data frame data to be scrambled, the modulo-2 addition (or exclusive-OR operation) is performed on one section of the specific pseudo-random sequence and one section of the data frame data to be scrambled, and the section of the data frame data to be scrambled is scrambled. Similarly, the pseudo-random sequence is also corresponding to the data frame data to be descrambled, the modulo-2 addition (or exclusive-OR operation) is performed on one section of the specific pseudo-random sequence and one section of the data frame data to be descrambled, and the section of the data frame data to be descrambled is descrambled. Further, the pseudo-random sequence configured to scramble and descramble the same section of the data frame data is the same section pseudo-random sequence. The data frame data to be scrambled may be the load data or the frame header information of the data frame, and the data frame data to be descrambled may also be the load data or the frame header information of the data frame.

The identification sequence refers to one section of the pseudo-random sequence on which the modulo-2 addition is performed with one section of the data frame data, the status information may be the identification sequence, or may be one section of data on which a calculation is performed according to certain rules to acquire the identification sequence, or may be a result after the modulo-2 addition is performed on the identification sequence and one section of the data frame data.

The identification sequence may be one section of the pseudo-random sequence on which the modulo-2 addition is performed with the first load data; or the data frame data may include the first load data and second load data, and the identification sequence may be one section of the pseudo-random sequence on which the modulo-2 addition is performed with the second load data; or the data frame data may include the first load data and the frame header information, and the identification sequence may be one section of the pseudo-random sequence on which the modulo-2 addition is performed with the frame header information. The second load data may be load data of a previous frame or a next frame of the data frame of the first load.

Figure 2:
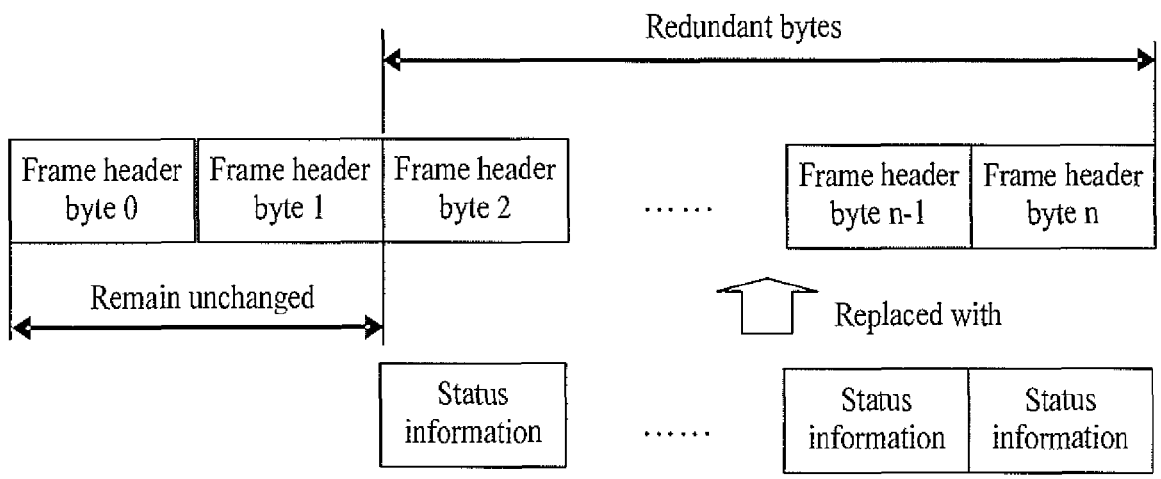
FIG. 2 is a schematic view of redundant bytes of frame header information according to a first embodiment of the data processing apparatus provided by the present invention.
Figure 3:
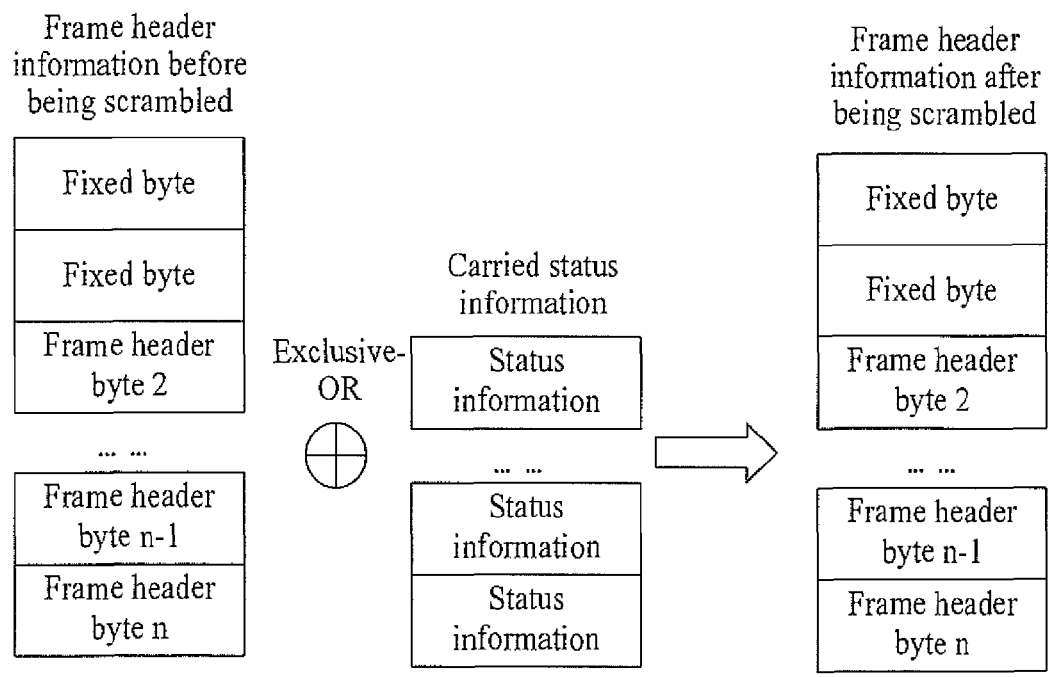
FIG. 3 is a schematic view of scrambling the frame header information according to the first embodiment of the data processing apparatus provided by the present invention.

The carrying the status information corresponding to the identification sequence in the frame header information includes the following cases: as shown in FIG. 2, the status information is added to redundant bytes of the frame header information; or as shown in FIG. 3, the data frame data includes the first load data and the frame header information, and the status information is a result after the modulo-2 addition is performed on the frame header information and the identification sequence, so that the status information is carried in the frame header information in a mode of scrambling the frame header information.

On the sending end, usually after being scrambled, the data frame is further encoded, and fixed information, for example, K28.5 and D5.6, or K28.5 and D16.2, may be placed in a fixed starting byte of the frame header information during the encoding procedure, so that the receiving end may identify the frame header information according to the fixed information. When the modulo-2 addition is performed on the frame header information and the identification sequence, the modulo-2 addition may not be performed on the fixed starting byte of the frame header information and the identification sequence, and the reason is that even if the status information is carried in the fixed starting byte of the frame header information, the status information may be lost during the encoding procedure. Definitely, the modulo-2 addition may be performed on the fixed starting byte of the frame header information and the identification sequence, so that the status information carried in the fixed starting byte of the frame header information is lost during the encoding procedure. On the receiving end, the status information carried in the fixed starting byte of the frame header information is not acquired, and a procedure of generating the pseudo-random sequence is adjusted according to the status information carried in other parts of the frame header information.

In addition, in order to identify the frame header information on the receiving end, if after being scrambled, the data frame data is not encoded, the modulo-2 addition does not need to be performed on the fixed starting byte of the frame header information and the identification sequence, and the reason is that the receiving end cannot find the fixed starting byte of the frame header information and thus cannot identify the frame header information.

Figure 4:
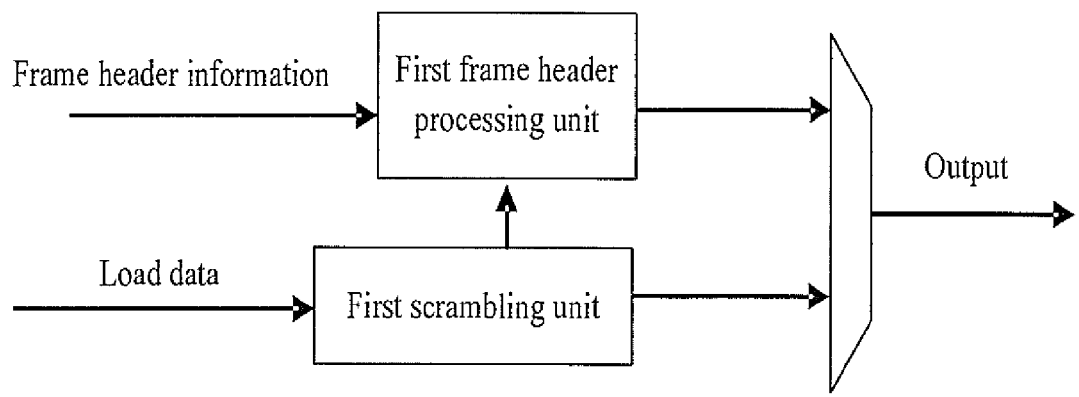
FIG. 4 is a schematic view of a first implementation mode of a scrambling processing unit according to the first embodiment of the data processing apparatus provided by the present invention.

FIG. 4 shows a first implementation mode of the scrambling processing unit, where the scrambling processing unit includes a first scrambling unit and a first frame header processing unit.

The first scrambling unit is configured to generate the PRBS, perform the modulo-2 addition (or exclusive-OR operation) on the pseudo-random sequence and the first load data, so as to scramble the first load data.

The first frame header processing unit is configured to use one section (a part or all) of a part of the pseudo-random sequence on which the modulo-2 addition is performed with the first load data as an identification sequence, and add the status information corresponding to the identification sequence to the redundant bytes of the frame header information.

The redundant bytes may be any bytes except for the bytes configured to identify the frame header information by the receiving end among the frame header information.

Figure 5:
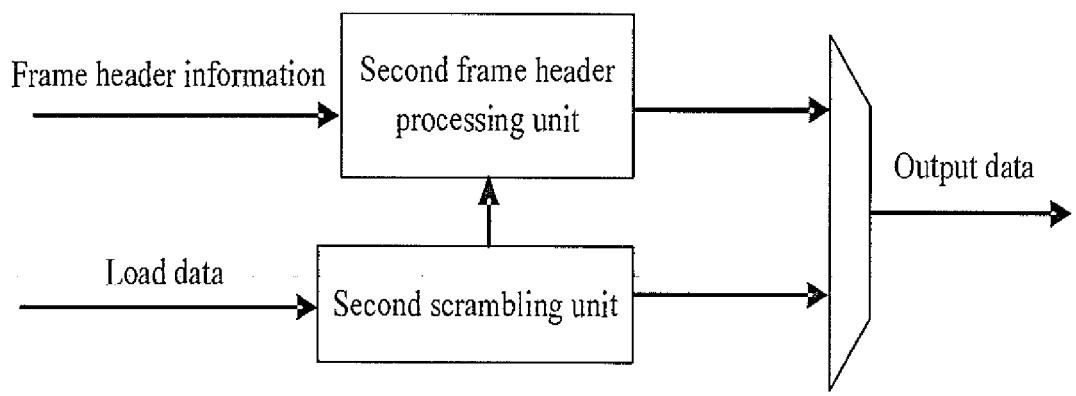
FIG. 5 is a schematic view of a second implementation mode of the scrambling processing unit according to the first embodiment of the data processing apparatus provided by the present invention.

FIG. 5 shows a second implementation mode of the scrambling processing unit, where the scrambling processing unit includes a second scrambling unit and a second frame header processing unit.

The second scrambling unit is configured to generate the PRBS, perform the modulo-2 addition (or exclusive-OR operation) on the pseudo-random sequence, and the first and second load data, so as to scramble the first load data and the second load data.

The second frame header processing unit is configured to use one section (a part or all) of a part of the pseudo-random sequence on which the modulo-2 addition is performed with the second load data as the identification sequence, and add the status information corresponding to the identification sequence to the redundant bytes of the frame header information.

Figure 6:
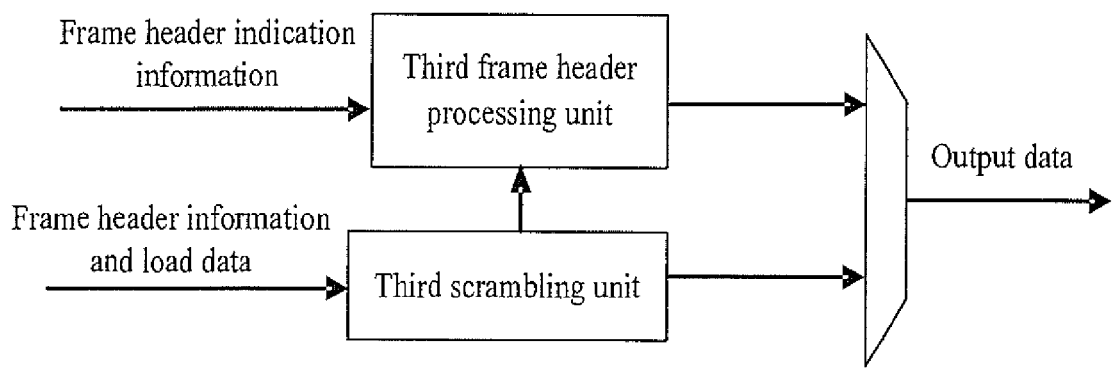
FIG. 6 is a schematic view of a third implementation mode of the scrambling processing unit according to the first embodiment of the data processing apparatus provided by the present invention.

FIG. 6 shows a third implementation mode of the scrambling processing unit, where the scrambling processing unit includes a third scrambling unit and a third frame header processing unit.

The third scrambling unit is configured to generate the PRBS, perform the modulo-2 addition (or exclusive-OR operation) on the pseudo-random sequence, with the first load data and the frame header information, so as to scramble the first load data and the frame header information.

The third frame header processing unit is configured to use one section (a part or all) of a part of the pseudo-random sequence on which the modulo-2 addition is performed with the frame header information as the identification sequence, and add the status information corresponding to the identification sequence to the redundant bytes of unscrambled frame header information.

Figure 7:
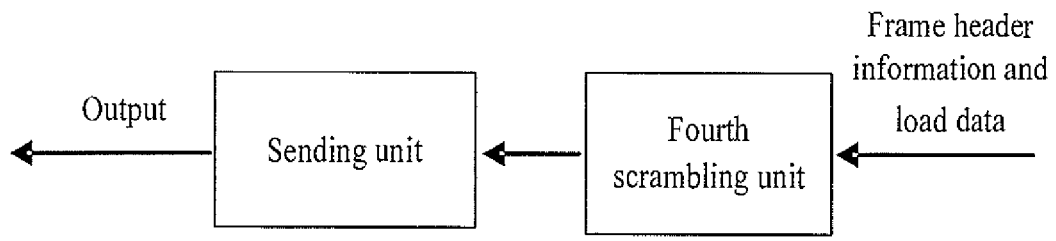
FIG. 7 is a schematic view of a fourth implementation mode of the scrambling processing unit according to the first embodiment of the data processing apparatus provided by the present invention.

FIG. 7 shows a fourth implementation mode of the scrambling processing unit, where the scrambling processing unit includes a fourth scrambling unit.

The fourth scrambling unit is configured to generate the PRBS, perform the modulo-2 addition (or exclusive-OR operation) on the pseudo-random sequence, with the first load data and the frame header information, so as to scramble the first load data and the frame header information, and carry the status information of one section of the pseudo-random sequence for scrambling the frame header information in the frame header information in a mode of scrambling the frame header information.

The first scrambling unit, the second scrambling unit, the third scrambling unit, and the fourth scrambling unit may be pseudo-random sequence generators or linear feedback shift registers.

As shown in FIG. 1, based on the embodiment of the data processing apparatus, the present invention further provides a first embodiment of a communications device, where the communications device includes a data processing apparatus. The data processing apparatus includes a scrambling processing unit and a sending unit.

The scrambling processing unit is configured to generate a PRBS, perform a modulo-2 addition on the pseudo-random sequence and data frame data so as to scramble the data frame data including first load data, use one section of a part of the pseudo-random sequence on which the modulo-2 addition is performed with the data frame data as an identification sequence, and carry status information corresponding to the identification sequence in frame header information.

The sending unit is configured to send the frame header information carrying the status information and the scrambled first load data.

Figure 8:
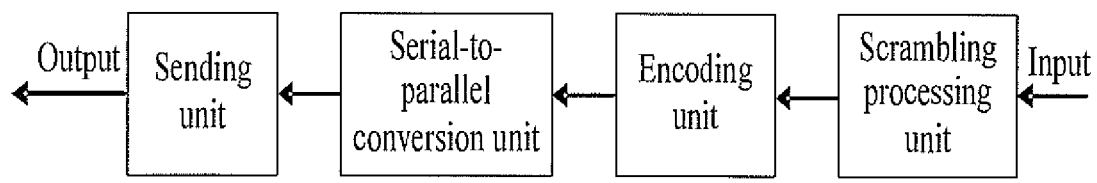
FIG. 8 is a schematic view of a second embodiment of a communications device according to the present invention.

As shown in FIG. 8, based on the embodiment of the data processing apparatus, the present invention provides a second embodiment of the communications device, where the communications device includes a scrambling processing unit, an encoding unit, a serial-to-parallel conversion unit, and a delivery unit.

The scrambling processing unit is configured to generate a PRBS, perform a modulo-2 addition on the pseudo-random sequence and data frame data so as to scramble the data frame data including first load data, use one section of a part of the pseudo-random sequence on which the modulo-2 addition is performed with the data frame data as an identification sequence, and carry status information corresponding to the identification sequence in frame header information.

The encoding unit is configured to encode the frame header information carrying the status information and the scrambled first load data. During the encoding process, the encoding unit performs a control byte encoding process on control bytes of the frame header information, or performs a data encoding process on data bytes of the first load data and the frame header information.

The serial-to-parallel conversion unit is configured to perform a serial-to-parallel conversion process on the frame header information and the first load data after being encoded.

The delivery unit is configured to send the frame header information and the first load data after the serial-to-parallel conversion process.

Figure 9:
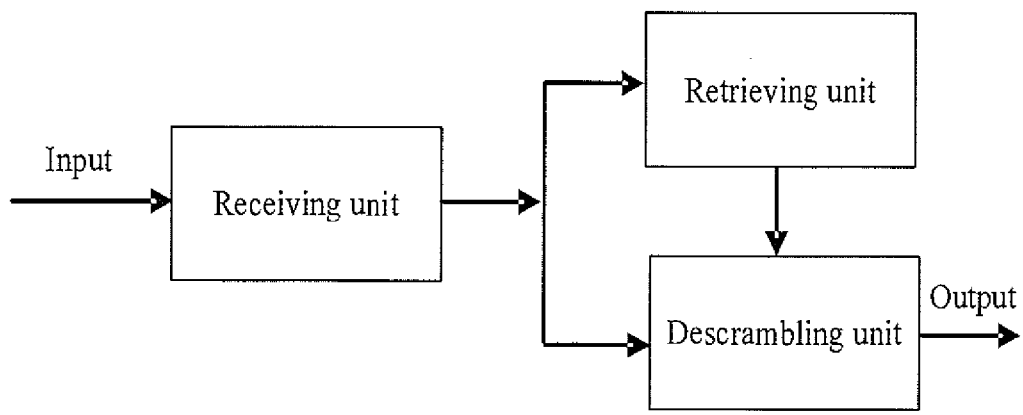
FIG. 9 is a schematic view of a second embodiment of the data processing apparatus according to the present invention.

As shown in FIG. 9, the data processing apparatus according to a second embodiment of the present invention includes a receiving unit, a retrieving unit, and a descrambling unit.

The receiving unit is configured to receive a scrambled data frame, where frame header information of the data frame carries status information.

The retrieving unit is configured to retrieve the status information from the frame header information.

The descrambling unit is configured to generate a PRBS, where the descrambling unit adjusts, according to the status information, a procedure of generating the PRBS, so as to generate the PRBS corresponding to data frame data to be descrambled; and further configured to perform a modulo-2 addition (or exclusive-OR) on the pseudo-random sequence and first load data, so as to descramble the first load data.

During the process of adjusting, according to the status information, the procedure of generating the PRBS, so as to generate the PRBS corresponding to the data frame data to be descrambled, the descrambling unit adjusts, according to a corresponding relation between the status information and the identification sequence and a corresponding relation between the identification sequence and the data frame data, the procedure of generating the pseudo-random sequence, so as to output one section of the specific pseudo-random sequence when descrambling the specific data frame data.

The process of adjusting, according to the status information, the procedure of generating the PRBS, so as to generate the PRBS corresponding to the data frame data to be descrambled, may be called a scrambling (scrambling processing unit/descrambling unit) synchronization process. Through the scrambling synchronization process, it is ensured that the pseudo-random sequence configured to scramble and descramble the same section of the data frame data is the same section of the pseudo-random sequence, so that after being descrambled, the data frame data may be correctly recovered to the original data frame data.

In this embodiment, after being received, the scrambled data frame data is descrambled, so that the data frame data is recovered. The second embodiment of the data processing apparatus may be disposed on the receiving end of the data frame.

Figure 10:
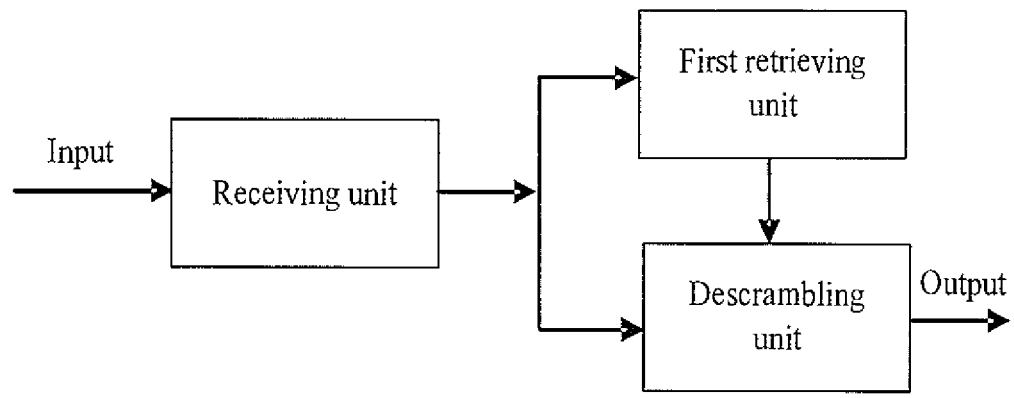
FIG. 10 is a schematic view of a first implementation mode of a retrieving unit according to the second embodiment of the data processing apparatus provided by the present invention.

FIG. 10 shows a first implementation mode of the retrieving unit, where the retrieving unit includes a first retrieving unit.

The first retrieving unit is configured to acquire the status information from redundant bytes of the frame header information.

Figure 11:
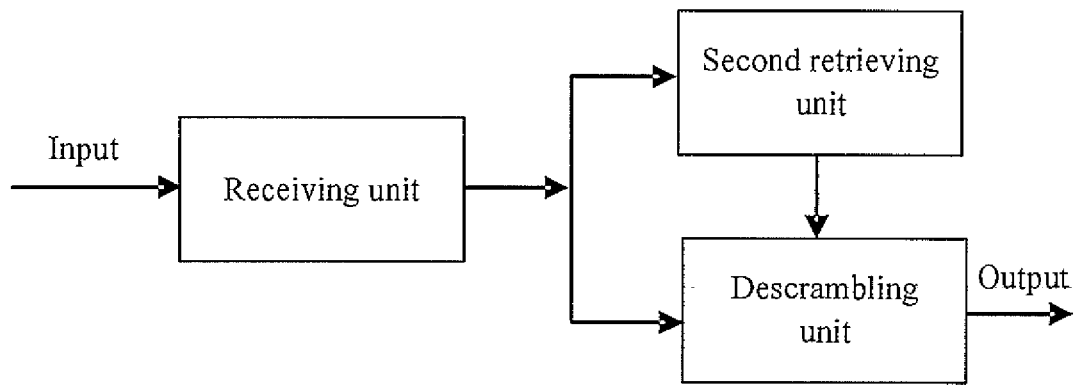
FIGS. 11 and 12 are schematic views of a second implementation mode of the retrieving unit according to the second embodiment of the data processing apparatus provided by the present invention.
Figure 12:
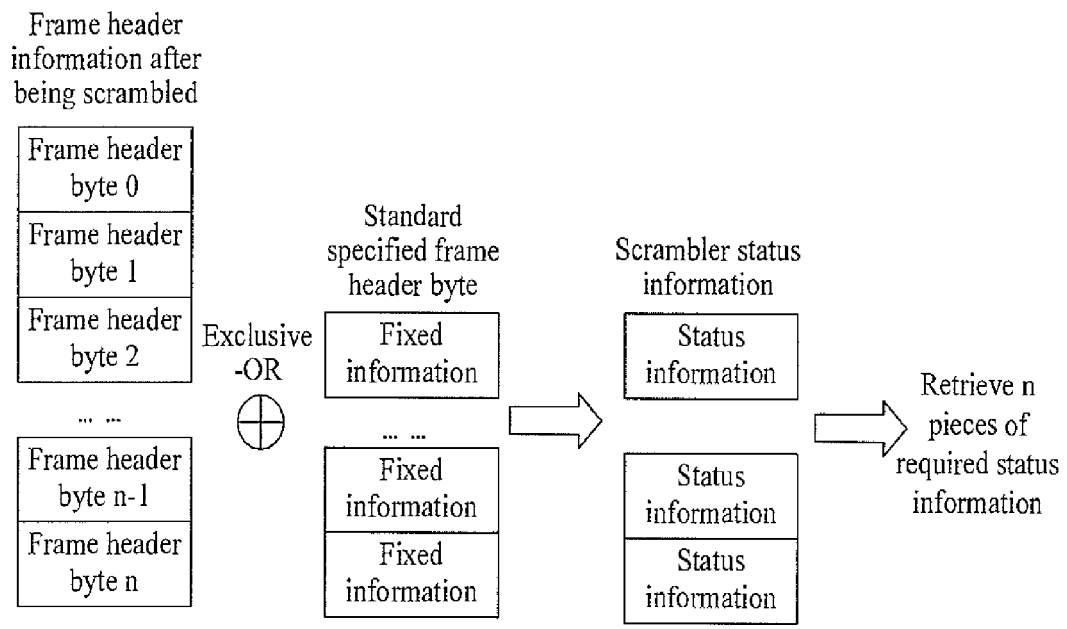

FIGS. 11 and 12 show a second implementation mode of the retrieving unit, where the retrieving unit includes a second retrieving unit.

The second retrieving unit is configured to perform the modulo-2 addition (or exclusive-OR operation) on the frame header information of the scrambled data frame and unscrambled frame header information, so as to acquire the status information, where the frame header information of the scrambled data frame is the scrambled frame header information.

In addition, when the modulo-2 addition (or exclusive-OR operation) is performed on the frame header information of the scrambled data frame and the unscrambled frame header information, the operation may not be performed on the fixed starting byte of the frame header information (referring to FIG. 3).

As shown in FIG. 9, based on the embodiment of the data processing apparatus, the present invention further provides a third embodiment of the communications device, which includes a receiving unit, a retrieving unit, and a descrambling unit.

The receiving unit is configured to receive a scrambled data frame, where frame header information of the data frame carries status information.

The retrieving unit is configured to retrieve the status information from the frame header information.

The descrambling unit is configured to generate a PRBS, where the descrambling unit adjusts, according to the status information, a procedure of generating the PRBS, so as to generate the PRBS corresponding to data frame data to be descrambled; and further configured to perform a modulo-2 addition (exclusive-OR operation) on the pseudo-random sequence and first load data, so as to descramble the first load data.

Figure 13:
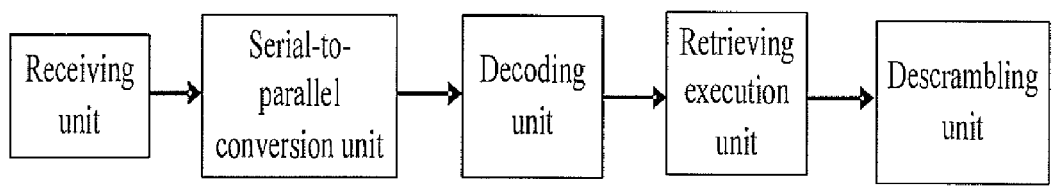
FIG. 13 is a schematic view of a fourth embodiment of the communications device according to the present invention.

As shown in FIG. 13, based on the embodiment of the data processing apparatus, the present invention further provides a fourth embodiment of the communications device, where the communications device includes a receiving unit, a serial-to-parallel conversion unit, a decoding unit, a retrieving execution unit, and a descrambling unit.

The receiving unit is configured to receive a scrambled data frame, where frame header information of the data frame carries status information.

The serial-to-parallel conversion unit is configured to perform a serial-to-parallel conversion process on the scrambled data frame.

The decoding unit is configured to decode the data frame after the serial-to-parallel conversion process, where during the decoding process, the decoding unit performs a control byte decoding process on control bytes of the frame header information of the data frame, or performs a data decoding process on data bytes of the first load data and the frame header information of the data frame; and further configured to generate a frame indication signal when identifying a fixed starting byte of the frame header information from the data frame after the serial-to-parallel conversion process, where the frame indication signal is configured to prompt that the frame header information of the data frame arrives.

The retrieving execution unit is configured to retrieve the status information from the frame header information, when knowing that the frame header information arrives according to the frame indication signal.

The descrambling unit is configured to generate a PRBS, where the descrambling unit adjusts, according to the status information, a procedure of generating the PRBS, so as to generate the PRBS corresponding to data frame data to be descrambled; and further configured to perform a modulo-2 addition (or exclusive-OR operation) on the pseudo-random sequence and first load data, and descramble the first load data.

As shown in FIG. 14, based on the embodiments of the data processing apparatus and the communications device, the present invention further provides an embodiment of a scrambling synchronization detection method, which includes the following steps.

In step 201, first status information is retrieved from frame header information of a first data frame, a first identification sequence corresponding to the first status information is acquired according to the first status information, a procedure of generating a pseudo-random sequence is adjusted according to the first identification sequence, so as to generate a PRBS corresponding to data frame data to be descrambled, M (M is an integer greater than or equal to 1) pieces of second status information are retrieved from frame header information of M data frames subsequent to the first data frame, M second identification sequences corresponding to the M pieces of second status information are acquired according to the M pieces of second status information, data frame data corresponding to the M second identification sequences is used as reference data, M sections of sample pseudo-random sequences corresponding to the reference data are retrieved from the generated pseudo-random sequence, and the M second identification sequences are compared with the M sections of sample pseudo-random sequences, where if L (L is an integer, and 0≤L<M) second identification sequences in the M second identification sequences are consistent with the corresponding sample pseudo-random sequences, step 201 is performed, and if the M second identification sequences are consistent with the corresponding sample pseudo-random sequences, step 202 is performed.

The adjusting, according to the identification sequence, the procedure of generating the pseudo-random sequence includes placing the identification sequence in a pseudo-random sequence generator or a linear feedback shift register.

Step 201 may be implemented in the following mode.

First status information is retrieved from frame header information of a first data frame, a first identification sequence corresponding to the first status information is acquired according to the first status information, a procedure of generating a pseudo-random sequence is adjusted according to the first identification sequence, so as to generate a PRBS corresponding to data frame data to be descrambled, frame header information of M (M is an integer greater than or equal to 1) data frames subsequent to the first data frame is descrambled, and M descrambling results are acquired, where if L (L is an integer, and 0≤L<M) descrambling results in the M descrambling results are consistent with unscrambled frame header information, step 201 is performed, and if the M descrambling results are consistent with the unscrambled frame header information, step 202 is performed.

In step 202, N (N is an integer greater than or equal to 1) pieces of third status information are retrieved from frame header information of N data frames, N third identification sequences corresponding to the N pieces of third status information are acquired according to the N pieces of third status information, data frame data corresponding to the N third identification sequences is used as reference data, N sections of sample pseudo-random sequences corresponding to the reference data are retrieved from the generated pseudo-random sequence, and the N third identification sequences are compared with the N sections of sample pseudo-random sequences, where if K (K is an integer, and 0≤K<N) third identification sequences in the N third identification sequences are inconsistent with the corresponding sample pseudo-random sequences, step 202 is performed, and if the N third identification sequences are inconsistent with the corresponding sample pseudo-random sequence, step 201 is performed.

Further, step 202 may be implemented in the following mode.

Frame header information of N (N is an integer greater than or equal to 1) data frames is descrambled, and N descrambling results are acquired, where if K (K is an integer, and 0≤K<N) descrambling results in the N descrambling results are inconsistent with unscrambled frame header information, step 202 is performed, and if the N descrambling results are inconsistent with the unscrambled frame header information, step 201 is performed.

In the steps, M and N may be 2, 4, 5, 6, or 8.

In the embodiment of the scrambling synchronization detection method, it is detected whether the scrambling is synchronous, and adjustment is performed when the scrambling is asynchronous, so it is ensured that on the sending end and the receiving end, the pseudo-random sequence configured to scramble and descramble the same section of the specific data frame data is the same section of the pseudo-random sequence, thereby alleviating the bit error problems during the procedure of transmitting the scrambled data frame data and recovering the original data frame data after the receiving end receives the scrambled data frame data.

Figure 15:
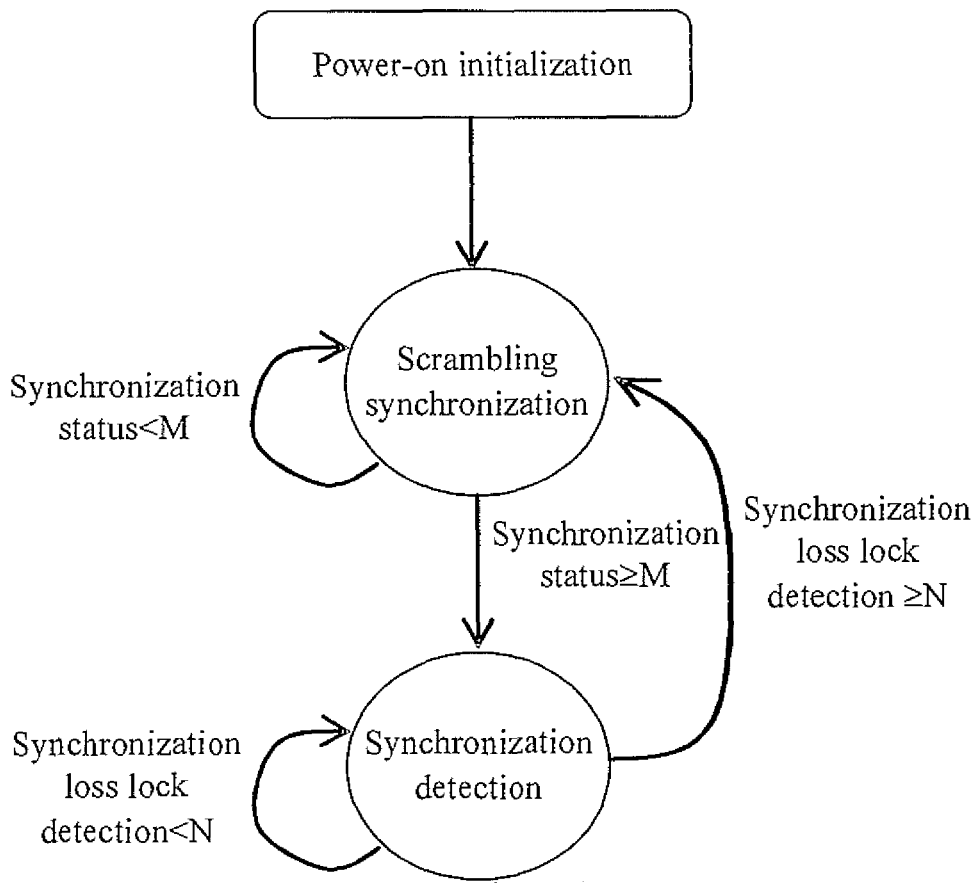
FIG. 15 is a schematic view of an embodiment of a scrambling synchronization detection apparatus according to the present invention.

As shown in FIG. 15, based on the embodiment of the scrambling synchronization detection method, the present invention further provides an embodiment of a scrambling synchronization detection apparatus, where the scrambling synchronization detection apparatus includes a scrambling synchronization unit and a synchronization detection unit.

The scrambling synchronization unit is configured to retrieve first status information from frame header information of a first data frame, acquire, according to the first status information, a first identification sequence corresponding to the first status information, adjust, according to the first identification sequence, a procedure of generating a pseudo-random sequence, so as to generate a PRBS corresponding to data frame data to be descrambled, retrieve M (M is an integer greater than or equal to 1) pieces of second status information from frame header information of M data frames subsequent to the first data frame, acquire, according to the M pieces of second status information, M second identification sequences corresponding to the M pieces of second status information, use data frame data corresponding to the M second identification sequences as reference data, retrieve M sections of sample pseudo-random sequences corresponding to the reference data from the generated pseudo-random sequence, and compare the M second identification sequences with the M sections of sample pseudo-random sequences, where if L (L is an integer, and 0≤L<M) second identification sequences in the M second identification sequences are consistent with the corresponding sample pseudo-random sequences, the scrambling synchronization unit continues execution, and if the M second identification sequences are consistent with the corresponding sample pseudo-random sequences, the synchronization detection unit starts execution.

The adjusting, according to the identification sequence, the procedure of generating the pseudo-random sequence includes placing the identification sequence in a pseudo-random sequence generator or a linear feedback shift register.

Another implementation mode of the scrambling synchronization unit may be a first scrambling synchronization unit. The first scrambling synchronization unit is configured to retrieve first status information from frame header information of a first data frame, acquire, according to the first status information, a first identification sequence corresponding to the first status information, adjust, according to the first identification sequence, a procedure of generating a pseudo-random sequence, so as to generate a PRBS corresponding to data frame data to be descrambled, descramble frame header information of M (M is an integer greater than or equal to 1) data frames subsequent to the first data frame, and acquire M descrambling results, where if L (L is an integer, and $0 \leq L < M$) descrambling results in the M descrambling results are consistent with unscrambled frame header information, the first scrambling synchronization unit continues execution, and if the M descrambling results are consistent with the unscrambled frame header information, the synchronization detection unit starts execution.

The synchronization detection unit is configured to retrieve N (N is an integer greater than or equal to 1) pieces of third status information from frame header information of N data frames, acquire, according to the N pieces of third status information, N third identification sequences corresponding to the N pieces of third status information, use data frame data corresponding to the N third identification sequences as reference data, retrieve N sections of sample pseudo-random sequences corresponding to the reference data from the generated pseudo-random sequence, and compare the N third identification sequences with the N sections of sample pseudo-random sequences, where if K (K is an integer, and $0 \leq K < N$) third identification sequences in the N third identification sequences are inconsistent with the corresponding sample pseudo-random sequences, the synchronization detection unit continues execution, and if the N third identification sequences are inconsistent with the corresponding sample pseudo-random sequence, the scrambling synchronization unit starts execution.

Another implementation mode of the synchronization detection unit may be a first synchronization detection unit. The first synchronization detection unit is configured to descramble frame header information of N (N is an integer greater than or equal to 1) data frames, and acquire N descrambling results, where if K (K is an integer, and $0 \leq K < N$) descrambling results in the N descrambling results are inconsistent with unscrambled frame header information, the first synchronization detection unit continues execution, and if the N descrambling results are inconsistent with the unscrambled frame header information, the scrambling synchronization unit starts execution.

Figure 16:
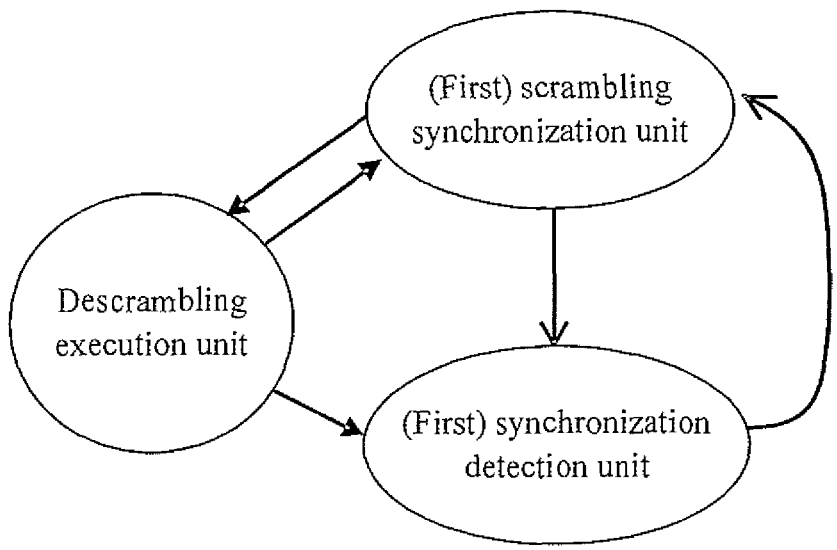
FIG. 16 is a schematic view of a fifth embodiment of the communications device according to the present invention.

As shown in FIG. 16, based on the embodiments of the scrambling synchronization detection apparatus and the data processing apparatus, the present invention further provides a fifth embodiment of the communications device, where the communications device includes a descrambling execution unit, a scrambling synchronization unit, and a synchronization detection unit.

The descrambling execution unit is configured to generate a PRBS, perform a modulo-2 addition (or exclusive-OR operation) on the pseudo-random sequence and data frame data, so as to descramble the data frame data.

The scrambling synchronization unit is configured to retrieve first status information from frame header information of a first data frame, acquire, according to the first status information, a first identification sequence corresponding to the first status information, adjust, according to the first identification sequence, a procedure of generating a pseudo-random sequence, so as to generate the PRBS corresponding to the data frame data to be descrambled, retrieve M (M is an integer greater than or equal to 1) pieces of second status information from frame header information of M data frames subsequent to the first data frame, acquire, according to the M pieces of second status information, M second identification sequences corresponding to the M pieces of second status information, use the data frame data corresponding to the M second identification sequences as reference data, retrieve M sections of sample pseudo-random sequences corresponding to the reference data from the generated pseudo-random sequence, and compare the M second identification sequences with the M sections of sample pseudo-random sequences, where if L (L is an integer, and $0 \leq L < M$) second identification sequences in the M second identification sequences are consistent with the corresponding sample pseudo-random sequences, the scrambling synchronization unit continues execution, and if the M second identification sequences are consistent with the corresponding sample pseudo-random sequences, the synchronization detection unit starts execution.

The adjusting, according to the identification sequence, the procedure of generating the pseudo-random sequence includes placing the identification sequence in a pseudo-random sequence generator or a linear feedback shift register.

The synchronization detection unit is configured to retrieve N (N is an integer greater than or equal to 1) pieces of third status information from frame header information of N data frames, acquire, according to the N pieces of third status information, N third identification sequences corresponding to the N pieces of third status information, use data frame data corresponding to the N third identification sequences as reference data, retrieve N sections of sample pseudo-random sequences corresponding to the reference data from the generated pseudo-random sequence, and compare the N third identification sequences with the N sections of sample pseudo-random sequences, where if K (K is an integer, and $0 \leq K < N$) third identification sequences in the N third identification sequences are inconsistent with the corresponding sample pseudo-random sequences, the synchronization detection unit continues execution, and if the N third identification sequences are inconsistent with the corresponding sample pseudo-random sequence, the scrambling synchronization unit starts execution.

Referring to FIG. 16, based on the embodiments of the scrambling synchronization detection apparatus and the data processing apparatus, the present invention further provides a sixth embodiment of the communications device, where the communications device includes a first scrambling synchronization unit and a synchronization detection unit.

The first scrambling synchronization unit is configured to retrieve first status information from frame header information of a first data frame, acquire, according to the first status information, a first identification sequence corresponding to the first status information, adjust, according to the first identification sequence, a procedure of generating a pseudo-random sequence, so as to generate a PRBS corresponding to data frame data to be descrambled, descramble frame header information of M data frames subsequent to the first data frame, and acquire M descrambling results, where if L descrambling results in the M descrambling results are consistent with unscrambled frame header information, the first scrambling synchronization unit continues execution, and if the M descrambling results are consistent with the unscrambled frame header information, the synchronization detection unit starts execution, where M is an integer greater than or equal to 1, L is an integer, and $0 \leq L < M$.

The synchronization detection unit is configured to retrieve N pieces of third status information from frame header information of N data frames, acquire, according to the N pieces of third status information, N third identification sequences corresponding to the N pieces of third status information, use data frame data corresponding to the N third identification sequences as reference data, retrieve N sections of sample pseudo-random sequences corresponding to the reference data from the generated pseudo-random sequence, and compare the N third identification sequences with the N sections of sample pseudo-random sequences, where if K third identification sequences in the N third identification sequences are inconsistent with the corresponding sample pseudo-random sequences, the synchronization detection unit continues execution, and if the N third identification sequences are inconsistent with the corresponding sample pseudo-random sequence, the first scrambling synchronization unit starts execution, where N is an integer greater than or equal to 1, K is an integer, and $0 \leq K < N$ As shown in FIG. 16, based on the embodiments of the scrambling synchronization detection apparatus and the data processing apparatus, the present invention further provides a seventh embodiment of the communications device, where the communications device includes a scrambling synchronization unit and a first synchronization detection unit.

The scrambling synchronization unit is configured to retrieve first status information from frame header information of a first data frame, acquire, according to the first status information, a first identification sequence corresponding to the first status information, adjust, according to the first identification sequence, a procedure of generating a pseudo-random sequence, so as to generate a PRBS corresponding to data frame data to be descrambled, retrieve M pieces of second status information from frame header information of M data frames subsequent to the first data frame, acquire, according to the M pieces of second status information, M second identification sequences corresponding to the M pieces of second status information, use data frame data corresponding to the M second identification sequences as reference data, retrieve M sections of sample pseudo-random sequences corresponding to the reference data from the generated pseudo-random sequence, and compare the M second identification sequences with the M sections of sample pseudo-random sequences, where if L second identification sequences in the M second identification sequences are consistent with the corresponding sample pseudo-random sequences, the scrambling synchronization unit continues execution, and if the M second identification sequences are consistent with the corresponding sample pseudo-random sequences, the first synchronization detection unit starts execution, where M is an integer greater than or equal to 1, L is an integer, and $0 \leq L < M$.

The first synchronization detection unit is configured to descramble frame header information of N data frames, and acquire N descrambling results, where if K descrambling results in the N descrambling results are inconsistent with unscrambled frame header information, the first synchronization detection unit continues execution, and if the N descrambling results are inconsistent with the unscrambled frame header information, the scrambling synchronization unit starts execution, where N is an integer greater than or equal to 1, K is an integer, and $0 \leq K < N$.

As shown in FIG. 16, based on the embodiments of the scrambling synchronization detection apparatus and the data processing apparatus, the present invention further provides an eighth embodiment of the communications device, where the communications device includes a first scrambling synchronization unit and a first synchronization detection unit.

The first scrambling synchronization unit is configured to retrieve first status information from frame header information of a first data frame, acquire, according to the first status information, a first identification sequence corresponding to the first status information, adjust, according to the first identification sequence, a procedure of generating a pseudo-random sequence, so as to generate a PRBS corresponding to data frame data to be descrambled, descramble frame header information of M data frames subsequent to the first data frame, and acquire M descrambling results, where if L descrambling results in the M descrambling results are consistent with unscrambled frame header information, the first scrambling synchronization unit continues execution, and if the M descrambling results are consistent with the unscrambled frame header information, the first synchronization detection unit starts execution, where M is an integer greater than or equal to 1, L is an integer, and $0 \leq L < M$.

The first synchronization detection unit is configured to descramble frame header information of N data frames, and acquire N descrambling results, where if K descrambling results in the N descrambling results are inconsistent with unscrambled frame header information, the first synchronization detection unit continues execution, and if the N descrambling results are inconsistent with the unscrambled frame header information, the first scrambling synchronization unit starts execution, where N is an integer greater than or equal to 1, K is an integer, and $0 \leq K < N$.

The first embodiment or the second embodiment of the communications device, and the third embodiment or the fourth embodiment or the fifth embodiment or the sixth embodiment or the seventh embodiment or the eighth embodiment of the communications device form a network system.

Figure 17:
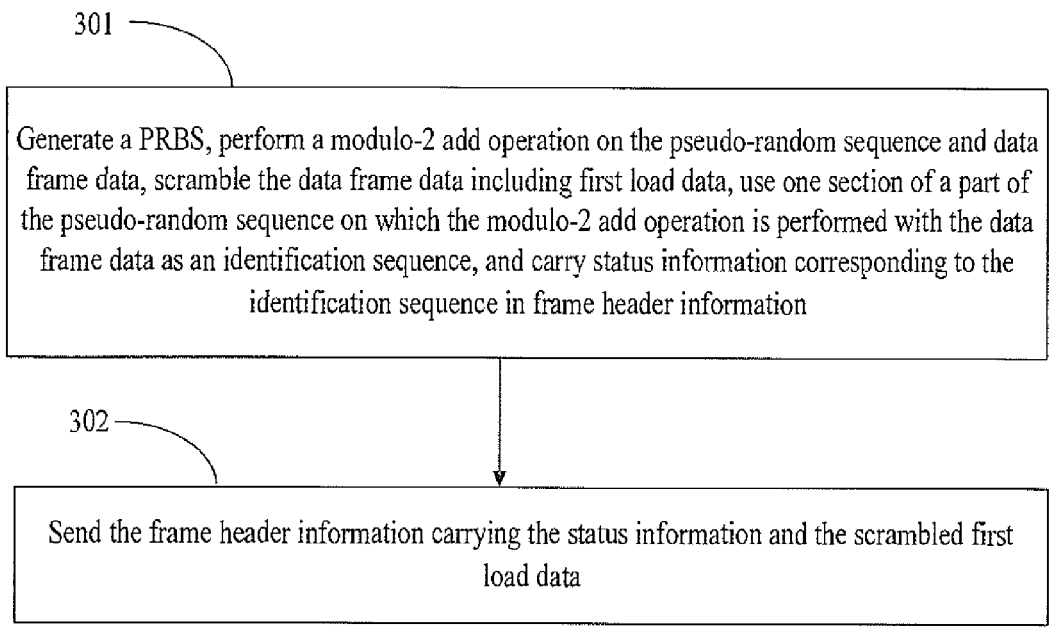
FIG. 17 is a schematic view of a first embodiment of a data processing method according to the present invention.

As shown in FIG. 17, based on the embodiment of the data processing apparatus, the present invention further provides a first embodiment of a data processing method.

In step 301, a PRBS is generated, a modulo-2 addition is performed on the pseudo-random sequence and data frame data, the data frame data including first load data is scrambled, one section of a part of the pseudo-random sequence on which the modulo-2 addition is performed with the data frame data is used as an identification sequence, and status information corresponding to the identification sequence is carried in frame header information.

In step 302, the frame header information carrying the status information and the scrambled first load data are sent.

The carrying the status information corresponding to the identification sequence in the frame header information includes the following cases: As shown in FIG. 2, the status information is added to redundant bytes of the frame header information; or as shown in FIG. 3, the data frame data includes the first load data and the frame header information, and the status information is a result after the modulo-2 addition is performed on the frame header information and the identification sequence, so that the status information is carried in the frame header information in a mode of scrambling the frame header information.

A first implementation mode of step 301 may include the following steps.

The PRBS is generated, the modulo-2 addition (or exclusive-OR operation) is performed on the pseudo-random sequence and the first load data, and the first load data is scrambled.

One section (a part or all) of a part of the pseudo-random sequence on which the modulo-2 addition is performed with the first load data is used as an identification sequence, and the status information corresponding to the identification sequence is added to the redundant bytes of the frame header information.

A second implementation mode of step 301 may include the following steps.

The PRBS is generated, the modulo-2 addition (or exclusive-OR) is performed on the pseudo-random sequence, with the first load data, and the second load data, so that the first load data and the second load data are scrambled.

One section (a part or all) of a part of the pseudo-random sequence on which the modulo-2 addition is performed with the second load data is used as an identification sequence, and the status information corresponding to the identification sequence is added to the redundant bytes of the frame header information.

A third implementation mode of step 301 may include the following steps.

The PRBS is generated, the modulo-2 addition (or exclusive-OR operation) is performed on the pseudo-random sequence with the first load data and the frame header information, so that the first load data and the frame header information are scrambled.

One section (a part or all) of a part of the pseudo-random sequence on which the modulo-2 addition is performed with the frame header information is used as an identification sequence, and the status information corresponding to the identification sequence is added to the redundant bytes of the unscrambled frame header information.

A fourth implementation mode of step 301 may include the following steps.

The PRBS is generated, the modulo-2 addition (or exclusive-OR operation) is performed on the pseudo-random sequence with the first load data and the frame header information, so that the first load data and the frame header information are scrambled, and the status information of one section of the pseudo-random sequence scrambling the frame header information is carried in the frame header information in a mode of scrambling the frame header information.

Figure 18:
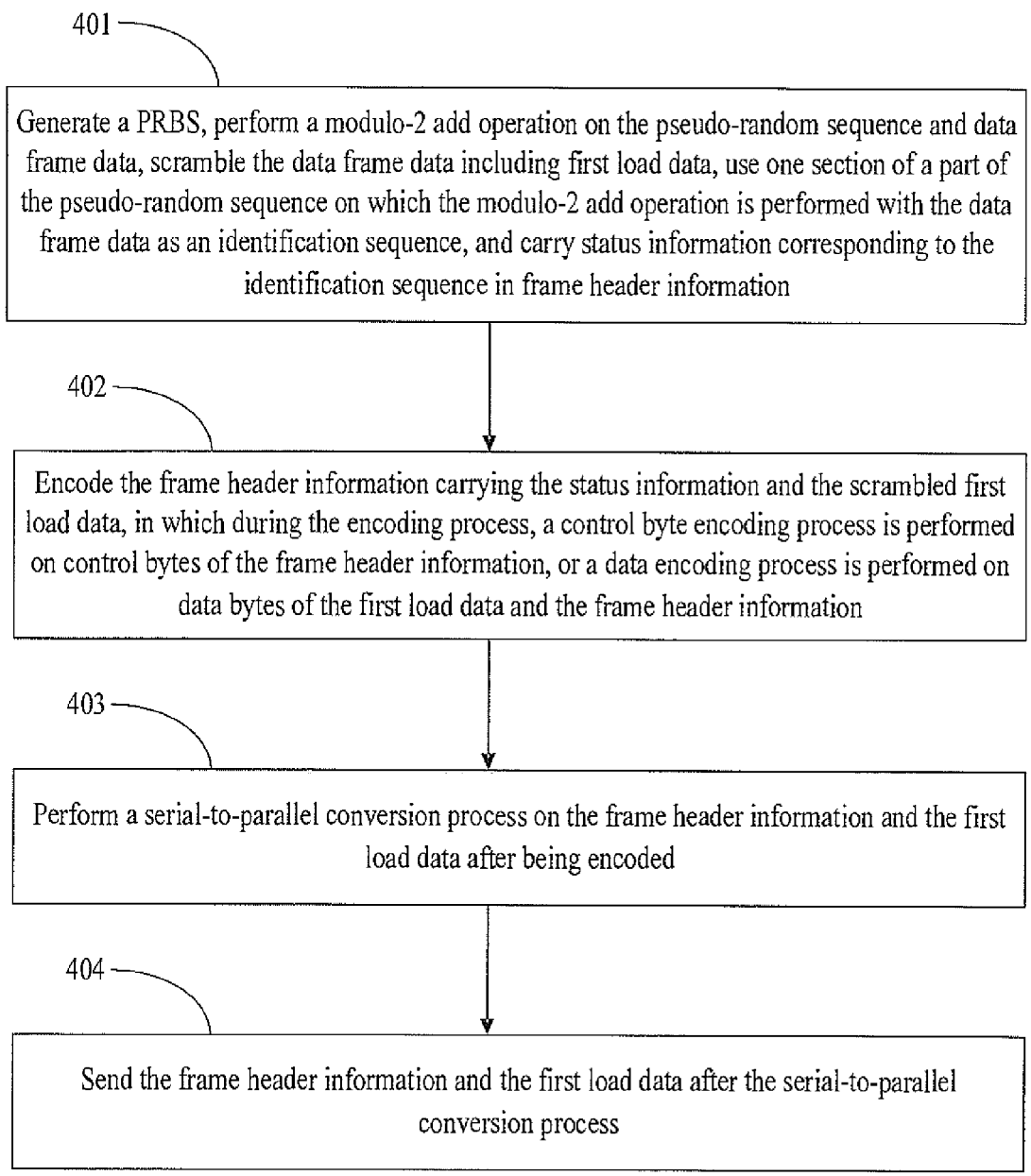
FIG. 18 is a schematic view of a second embodiment of the data processing method according to the present invention.

As shown in FIG. 18, based on the embodiment of the communications device, the present invention further provides a second embodiment of the data processing method, which includes the following steps.

In step 401, a PRBS is generated, a modulo-2 addition is performed on the pseudo-random sequence and data frame data, the data frame data including first load data is scrambled, one section of a part of the pseudo-random sequence on which the modulo-2 addition is performed with the data frame data is used as an identification sequence, and status information corresponding to the identification sequence is carried in frame header information.

In step 402, the frame header information carrying the status information and the scrambled first load data are encoded, where during the encoding process, a control byte encoding process is performed on control bytes of the frame header information, or a data encoding process is performed on data bytes of the first load data and the frame header information.

In step 403, a serial-to-parallel conversion process is performed on the frame header information and the first load data after being encoded.

In step 404, the frame header information and the first load data after the serial-to-parallel conversion process are sent.

Figure 19:
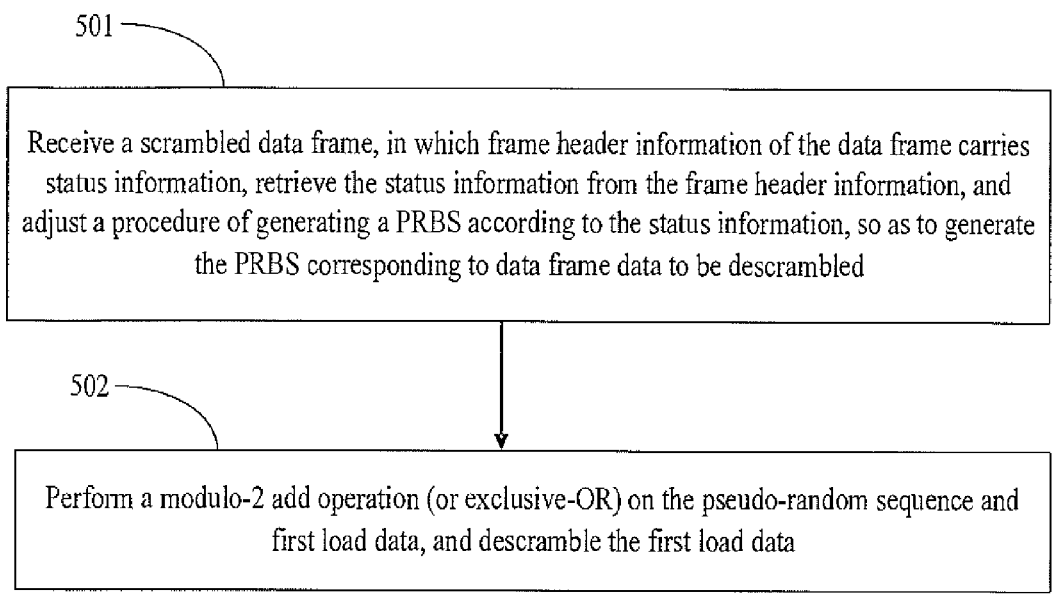
FIG. 19 is a schematic view of a third embodiment of the data processing method according to the present invention.

As shown in FIG. 19, based on the embodiment of the data processing apparatus, the present invention further provides a third embodiment of the data processing method, which includes the following steps.

In step 501, a scrambled data frame is received, where frame header information of the data frame carries status information, the status information is retrieved from the frame header information, and a procedure of generating a PRBS is adjusted according to the status information, so as to generate the PRBS corresponding to data frame data to be descrambled.

In step 502, a modulo-2 addition (or exclusive-OR operation) is performed on the pseudo-random sequence and first load data, so that the first load data is descrambled.

Steps 501 and 502 may be performed at the same time; or step 501 is performed first, and then step 502 is performed; or step 502 is performed first, and then step 501 is performed.

The retrieving the status information from the frame header information includes the following cases: as shown in FIG. 10, the status information is acquired from redundant bytes of the frame header information; or as shown in FIGS. 11 and 12, the modulo-2 addition (or exclusive-OR operation) is performed on the frame header information of the scrambled data frame and unscrambled frame header information, so that the status information is acquired, where the frame header information of the scrambled data frame is scrambled frame header information.

Figure 20:
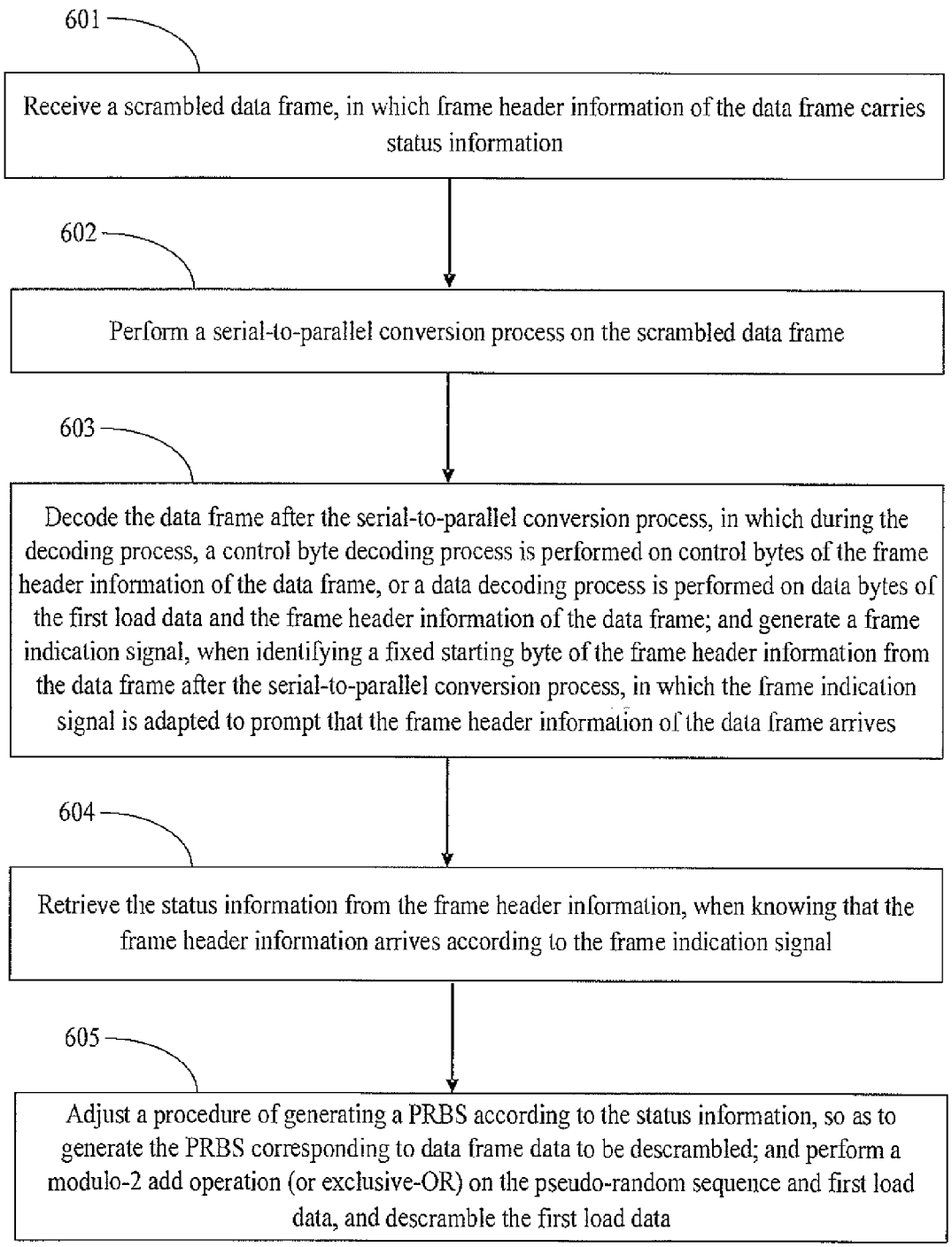
FIG. 20 is a schematic view of a fourth embodiment of the data processing method according to the present invention.

As shown in FIG. 20, based on the embodiment of the communications device, the present invention further provides a fourth embodiment of the data processing method, which includes the following steps.

In step 601, a scrambled data frame is received, where frame header information of the data frame carries status information.

In step 602, a serial-to-parallel conversion process is performed on the scrambled data frame.

In step 603, the data frame after the serial-to-parallel conversion process is decoded, where during the decoding process, a control byte decoding process is performed on control bytes of the frame header information of the data frame, or a data decoding process is performed on data bytes of the first load data and the frame header information of the data frame; and a frame indication signal is generated, when identifying a fixed starting byte of the frame header information from the data frame after the serial-to-parallel conversion process, where the frame indication signal is configured to prompt that the frame header information of the data frame arrives.

In step 604, the status information is retrieved, according to the frame indication signal, from the frame header information, when the frame header information arrives.

In step 605, a procedure of generating a PRBS is adjusted according to the status information, so as to generate the PRBS corresponding to data frame data to be descrambled; and a modulo-2 addition (or exclusive-OR operation) is performed on the pseudo-random sequence and first load data, so that the first load data is descrambled Persons of ordinary skill in the art should understand that that all of or a part of processes in the method according to the embodiments may be implemented by a computer program instructing relevant hardware. The program may be stored in a computer readable storage medium. When the program is executed, the processes of the method according to the embodiments of the present invention are performed. The storage medium may be a read-only memory (ROM)/a random access memory (RAM), a magnetic disk, or an optical disk.

In the present invention, through the scrambling technology, the signal is randomized to become the pseudo-random sequence, thereby alleviating the ISI problem. Further, after the data code stream is received, the data code stream is scrambled, thereby improving the recovery quality of a timing clock, and smoothing the signal spectrum, which is favorable to channel transmission.

What is claimed is:

1. A data processing apparatus, comprising:
a scrambling processing unit, configured to generate a Pseudo-Random Binary Sequence (PRBS), perform a modulo-2 addition on the pseudo-random sequence and data frame data, scramble the data frame data comprising first load data, use one section of a part of the pseudo-random sequence on which the modulo-2 addition is performed with the data frame data as an identification sequence, and carry status information corresponding to the identification sequence in frame header information; and
a sending unit, configured to send the frame header information carrying the status information and the scrambled first load data;
wherein the scrambling processing unit comprises:
a first scrambling unit, configured to generate the PRBS, perform the modulo-2 addition on the pseudo-random sequence and the first load data, so as to scramble the first load data; and
a first frame header processing unit, configured to use one section of a part of the pseudo-random sequence on which the modulo-2 addition is performed with the first load data as the identification sequence, and add the status information corresponding to the identification sequence to redundant bytes of the frame header information.

2. A data processing apparatus, comprising:
a scrambling processing unit, configured to generate a Pseudo-Random Binary Sequence (PRBS), perform a modulo-2 addition on the pseudo-random sequence and data frame data, scramble the data frame data comprising first load data, use one section of a part of the pseudo-random sequence on which the modulo-2 addition is performed with the data frame data as an identification sequence, and carry status information corresponding to the identification sequence in frame header information; and
a sending unit, configured to send the frame header information carrying the status information and the scrambled first load data;
wherein the scrambling processing unit comprises:
a second scrambling unit, configured to generate the PRBS, perform the modulo-2 addition on the pseudo-random sequence, with the first load data and second load data, so as to scramble the first load data and the second load data; and
a second frame header processing unit, configured to use one section of a part of the pseudo-random sequence on which the modulo-2 addition is performed with the second load data as the identification sequence, and add the status information corresponding to the identification sequence to redundant bytes of the frame header information.

3. A data processing apparatus, comprising:
a scrambling processing unit, configured to generate a Pseudo-Random Binary Sequence (PRBS), perform a modulo-2 addition on the pseudo-random sequence and data frame data, scramble the data frame data comprising first load data, use one section of a part of the pseudo-random sequence on which the modulo-2 addition is performed with the data frame data as an identification sequence, and carry status information corresponding to the identification sequence in frame header information; and
a sending unit, configured to send the frame header information carrying the status information and the scrambled first load data;
wherein the scrambling processing unit comprises:
a third scrambling unit, configured to generate the PRBS, perform the modulo-2 addition on the pseudo-random sequence, with the first load data and the frame header information, so as to scramble the first load data and the frame header information; and
a third frame header processing unit, configured to use one section of a part of the pseudo-random sequence on which the modulo-2 addition is performed with the frame header information as the identification sequence, and add the status information corresponding to the identification sequence to redundant bytes of unscrambled frame header information.

4. A data processing method, comprising:
generating a Pseudo-Random Binary Sequence (PRBS), performing a modulo-2 addition on the pseudo-random sequence and data frame data so as to scramble the data frame data comprising first load data, using one section of a part of the pseudo-random sequence on which the modulo-2 addition is performed with the data frame data as an identification sequence, and carrying status information corresponding to the identification sequence in frame header information;
sending the frame header information carrying the status information and the scrambled first load data;
generating the PRBS, performing the modulo-2 addition on the pseudo-random sequence and the first load data, so as to scramble the first load data; and
using one section of a part of the pseudo-random sequence on which the modulo-2 addition is performed with the first load data as the identification sequence, and adding the status information corresponding to the identification sequence to redundant bytes of the frame header information.

5. A data processing method, comprising:
generating a Pseudo-Random Binary Sequence (PRBS), performing a modulo-2 addition on the pseudo-random sequence and data frame data so as to scramble the data frame data comprising first load data, using one section of a part of the pseudo-random sequence on which the modulo-2 addition is performed with the data frame data as an identification sequence, and carrying status information corresponding to the identification sequence in frame header information;
sending the frame header information carrying the status information and the scrambled first load data;
generating the PRBS, performing the modulo-2 addition on the pseudo-random sequence with the first load data and second load data, so as to scramble the first load data and the second load data; and
using one section of a part of the pseudo-random sequence on which the modulo-2 addition is performed with the second load data as the identification sequence, and adding the status information corresponding to the identification sequence to redundant bytes of the frame header information.

6. A data processing method, comprising:
generating a Pseudo-Random Binary Sequence (PRBS), performing a modulo-2 addition on the pseudo-random sequence and data frame data so as to scramble the data frame data comprising first load data, using one section of a part of the pseudo-random sequence on which the modulo-2 addition is performed with the data frame data as an identification sequence, and carrying status information corresponding to the identification sequence in frame header information;

sending the frame header information carrying the status information and the scrambled first load data;

generating the PRBS, performing the modulo-2 addition on the pseudo-random sequence with the first load data and the frame header information, so as to scramble the first load data and the frame header information; and using one section of a part of the pseudo-random sequence on which the modulo-2 addition is performed with the frame header information as the identification sequence, and adding the status information corresponding to the identification sequence to redundant bytes of unscrambled frame header information.

* * * * *